United States Patent [19]

Roman

[11] Patent Number: 4,692,259

[45] Date of Patent: Sep. 8, 1987

[54] WATER-ACTIVATED, EXOTHERMIC CHEMICAL DEICING FORMULATIONS

[75] Inventor: Ronald J. Roman, Renton, Wash.

[73] Assignee: L-Bar Products Incorporated, Ravensdale, Wash.

[21] Appl. No.: 901,916

[22] Filed: Aug. 29, 1986

[51] Int. Cl.$^4$ .......................... C09K 5/00; C09K 3/18
[52] U.S. Cl. .................... 252/70; 44/3.6 R; 75/24; 75/67 R; 126/263; 149/37; 149/40; 149/44
[58] Field of Search ............ 252/70; 126/263; 44/3 R; 75/24, 67 R, 67 A; 149/37, 40, 44

[56] References Cited

U.S. PATENT DOCUMENTS

| | | | |
|---|---|---|---|
| 2,327,153 | 8/1943 | Newhams et al. | 75/24 |
| 2,918,052 | 12/1959 | Budenholzer et al. | 126/263 |
| 3,624,243 | 11/1971 | Scott, Jr. et al. | 252/70 |
| 3,630,913 | 12/1971 | Scott, Jr. et al. | 252/70 |
| 4,081,256 | 3/1978 | Donnelly | 62/4 |
| 4,163,079 | 7/1979 | Beafore | 428/411 |
| 4,247,331 | 1/1981 | Hamlin et al. | 106/13 |
| 4,254,166 | 3/1981 | Glanville | 427/212 |
| 4,279,641 | 7/1981 | Skach, Jr. et al. | 75/67 R |
| 4,400,285 | 8/1983 | Gancy | 252/70 |
| 4,425,251 | 1/1984 | Gancy | 126/263 |
| 4,430,242 | 2/1984 | Gancy | 252/70 |
| 4,434,190 | 2/1984 | Dubois | 427/136 |
| 4,444,672 | 4/1984 | Gancy | 252/70 |
| 4,488,978 | 12/1984 | Gancy | 252/70 |
| 4,588,512 | 5/1986 | Rippie | 252/70 |

FOREIGN PATENT DOCUMENTS 45745  3/1980  Japan ..................... 252/70

*Primary Examiner*—Robert A. Wax
*Attorney, Agent, or Firm*—Seed and Berry

[57] ABSTRACT

A dry, water-activated, exothermic chemical formulation useful as a deicing agent on surfaces, which includes magnesium metal and magnesium oxide, and at least one chloride salt to depress the freezing point of water and prevent the buildup of snow and ice on surfaces.

22 Claims, No Drawings

WATER-ACTIVATED, EXOTHERMIC CHEMICAL DEICING FORMULATIONS

DESCRIPTION

1. Technical Field

The present invention relates in general to chemical road deicing formulations, and more particularly, to a water-activated, exothermic chemical deicing formulation containing magnesium metal, magnesium oxide, and chloride salts.

2. Background Art

Removal of snow and ice from roads, highways, walkways, and airport runways has become a necessity in order to ensure safer driving conditions for motorists, reduce delays and accidents at airports, and increase safety for pedestrians. Snow and ice removal reduces human tragedy, medical costs, and insurance costs and also reduces lost production time due to accidents on the road, disability and death due to highway accidents, and tardiness in arriving at the work place due to highway ice-related delays.

Over the past fifty years, chemical deicers have often become preferable over mechanical deicing devices, such as snowplows or snow blowers. Chemical deicing systems allow prevention of snow and ice buildup as well as snow and ice removal. The chemical deicing agent of choice in the United States has been sodium chloride, with an estimated usage rate of 12 million tons per year. While sodium chloride is inexpensive and easily obtained, its effect on the environment is detrimental and costly. Sodium chloride causes metallic corrosion of bridge structures and roadway vehicles and has been found to increase the sodium level of ground waters to dangerous levels in many instances. Sodium chloride also sterilizes soil and can kill vegetation. This is detrimental to soil structure, with consequent accelerated wind and rain erosion. Sodium chloride also has the major disadvantage of losing its effectiveness as a deicing agent below 20° F.

An alternative to sodium chloride is calcium chloride, which is used at approximately 1–2% the rate of sodium chloride. Its effects on the environment are even more deleterious than the effects of sodium chloride.

Calcium acetate and calcium acetate containing a certain amount of magnesium ion have also been used as deicers. However, calcium acetate in its common form is not adaptable to existing storage, handling, and spreading practices and hardware. The calcium acetate must be transformed by physical, physiochemical, or chemical modification into a hard, coarse, non-friable particle, which involves additional handling and greater costs in time and money.

Calcium magnesium acetate has also been used as a deicing agent; however, its expense makes its use as a deicing agent non-economical.

The chemical deicing systems discussed above operate primarily by lowering the freezing point of water. Attempts have been made to couple the freezing point lowering phenomenon with an exothermic reaction to actually generate heat and thereby aid in the melting of snow and ice. For example, a mixture of metallic sodium and sodium hydroxide has been used as a deicing agent. The exothermic nature of the sodium and water reaction, together with the freezing point depressant effect exerted by the sodium hydroxide, result in a dual-action deicing agent. However, the benefits of the metallic sodium and sodium hydroxide system are offset by the hazardous nature of metallic sodium, the environmentally harmful effects of caustic sodium hydroxide, and the difficulties in handling such a mixture.

Accordingly, there exists a need for a chemical deicing agent which is environmentally safe and which exhibits both freezing point depression activity and exothermic reactivity with water.

3. Disclosure of the Invention

Briefly stated, the present invention is directed toward a method for melting snow or ice on a variety of surfaces, including roadways, driveways, and sidewalks. The method generally comprises applying to the surface an effective amount of a chemical formulation comprising magnesium metal, magnesium oxide, and at least one chloride salt. The chemical formulation may further comprise magnesium nitride and/or calcium oxide. Suitable chloride salts include magnesium chloride, potassium chloride, calcium chloride, and sodium chloride. In addition, a mixture of two or more of these chloride salts may be used.

Another aspect of the present invention discloses a snow and ice control composition for use on surfaces, such as those described above. The composition generally comprises a mixture of a traction material and a chemical formulation comprising magnesium metal, magnesium oxide, and at least one chloride salt. A preferred traction material in this regard is sand.

Yet another aspect of the present invention is directed toward a process for the manufacture of a composition suitable for surface deicing comprising a traction material and a chemical formulation containing magnesium metal, magnesium oxide, and chloride salts. The process generally comprises the steps of (a) providing solidified sludge bars from spent flux of a magnesium processing refining furnace, (b) grinding the sludge bars to produce a minus 35 mesh fraction, and (c) mixing the minus 35 mesh fraction with a traction material.

These and other aspects of the present invention will become evident upon reference to the following detailed description.

4. Best Mode for Carrying Out the Invention

As noted above, the present invention is directed toward snow and ice control compositions as well as a method for melting snow or ice on surfaces such as roadways, highways, and sidewalks.

In a preferred embodiment, the composition described above is a dry, water-activated composition which exhibits freezing point depression activity as well as exothermic reactivity with water. More specifically, the composition acts by lowering the freezing point of water as well as generating heat through an exothermic reaction with water. Through the use of a traction material, such as sand, within the compositions described herein, the compositions enhance safety by substantially preventing slipping and sliding, in addition to providing deicing activity.

The composition of the present invention may be economically obtained from solidified sludge bars generated from spent flux of a magnesium processing refining furnace. For example, the solidified sludge bars may be crushed to a size of approximately a minus 35 mesh. The crush sludge bars provide a coarse particle blend which contains the magnesium, magnesium oxide, and chloride salts. The coarse particle blend is then mixed with a suitable traction material to increase its effectiveness.

An important active ingredient in the composition described above, and included within the chemical formulation used within the methods of the present invention, is magnesium metal. The magnesium metal is generally present as fine particulates. Preferably, the magnesium content of the formulation is approximately 1-10% by weight. The magnesium reacts with water to produce heat and magnesium hydroxide.

The formulation of the present invention may also contain magnesium nitride and/or calcium oxide, which react exothermically with water.

Another important element of the chemical formulation of the present invention is magnesium oxide, which also reacts exothermically with water. The chemical formulation also contains chloride salts, which depress the freezing point of water. In addition, the chloride salts are a source of chloride ion, which may combine with magnesium ion generated in the exothermic reactions to produce magnesium chloride. This is beneficial because the large percentage of magnesium chloride allows ice and snow to be melted at temperatures to negative 30° F. Thus, the present formulation is useful at temperatures where sodium chloride is not useful.

As noted above, the chemical formulation contains magnesium metal, magnesium oxide, and at least one chloride salt. The chloride salt may be magnesium chloride, potassium chloride, calcium chloride, sodium chloride, or a mixture thereof. Preferably, the magnesium metal content of the formulation is approximately 5-10% by weight of the formulation, and the magnesium oxide content is approximately 20-25% by weight of the formulation.

The chemical formulation may further be mixed with a traction material, such as sand, nutshells, expanded shale, pulverized corncobs, and the like to form the composition described herein. The main requirement of the traction material is that it possess sufficient density so that when it is added to the chemical formulation and applied to the desired surface, it will not be easily blown off the surface by ambient wind conditions. Preferably, after the formulation is mixed with the traction material, the formulation constitutes approximately 10-20% by weight of the mixture, with the remainder being traction material.

As noted above, the chemical formulation described herein may be obtained as a by-product from a magnesium processing plant. More specifically, a magnesium processing plant produces not only magnesium, but also various by-products. Magnesium oxide, which is obtained by the calcination of dolomite, is reduced by ferrosilicon to produce magnesium metal in a gaseous form. The magnesium gas is collected in a condenser and transferred to the refining furnace, remelted, and cleaned by a flux to remove both particulate impurities and calcium, which has also been reduced to some extent in the process.

During the refining process in the vacuum furnace, separation takes place because of the difference in the energy level of the liquidus-gaseous phases of calcium and magnesium. The liquidus, void of magnesium, is discharged as a waste slag. In the refining furnace, a salt flux is added to remove impurities, minimize oxidation, and assist in coagulation. After the molten magnesium is pumped from the furnace crucible and poured into ingot molds, the spent flux or sludge is transferred into large molds, allowed to freeze, and discarded as sludge bars.

The sludge bars are produced by the cooling of the molten spent flux, which has been poured into molds which measure approximately six feet by three feet by two feet. The bars comprise a mixture of this spent flux and impurities and unrefined magnesium. The bars typically contain varying quantities of small-sized magnesium pellets in a matrix of finely crystallized magnesium oxide (formed by burning magnesium during the refining process), calcium chloride, potassium chloride, and magnesium chloride.

The sludge bars are further processed to recover additional magnesium metal. The bars are crushed in three stages with a primary jaw crusher, a secondary crusher, and a rolls crusher. The product of the rolls crusher is then sent to a cage mill for grinding. The larger chunks of metal (plus 2 inchs) are hand-picked after the secondary jaw. Massive chunks (plus 2 feet) are generally hand-sorted by the crusher operator. The cage mill reduces the crushed fragments of the spent flux to a fine powder. The metallic fraction, being malleable, is not reduced in size and is separated by circular screens. The screens divide the feed into three fractions: (1) a plus 5 mesh containing almost pure metal; (2) a 5 by 35 mesh which is reground to reduce the flux content further (but is still salt coated); and (3) a minus 35 mesh function which is low metal and is mostly spent flux.

It is the minus 35 mesh fraction, or sludge bar residue, which may be used within the present invention. It is not toxic and is composed of commonly used compounds. Use of this material as a deicing agent prevents disposal problems of huge quantities of sludge bar residue. The sludge bar residue exhibits exothermic activity when combined with water because of the reaction between magnesium and water and the reaction between magnesium oxide and water. The minus 35 mesh fraction, or coarse particle blend, also decreases the freezing point of water because of the presence of chloride salts. The combination of the exothermic reactivity and the depression of the freezing point of water makes the coarse particle blend ideal for use as a deicing agent.

In addition to obtaining a useful chemical formulation as a by-product from a magnesium processing plant, it will be evident to one skilled in the art that suitable formulations comprising magnesium metal, magnesium oxide, and at least one chloride salt may be generated through the use of standard techniques well known in the art.

Use of the chemical formulation as a deicing agent does not lead to death of vegetation and consequent soil erosion problems caused by sodium chloride. On the contrary, the chemical formulation encourages plant growth, to the extent that an alternative use for the sludge bar residue is use as a fertilizer. Thus, while the use of sodium chloride can lead to soil erosion and environmental contamination, the use of the chemical formulation increases plant growth, thereby increasing soil stability.

As noted above, in one embodiment the chemical formulation may further comprise magnesium nitride. The preferred ranges for the components of the this chemical formulation are approximately as follows:

| Component | Percentage (by weight) |
|---|---|
| Mg (metal) | 5-10% |
| MgO | 20-25% |
| $MgCl_2$ | 0-20% |
| $Mg_3N_2$ | 0-20% |

| Component | Percentage (by weight) |
|---|---|
| CaCl$_2$ | 0–20% |
| KCl | 0–25% |

A particularly preferred component analysis within the embodiment set forth above is approximately as follows:

| Component | Percentage (by weight) |
|---|---|
| Mg (metal) | 5% |
| MgO | 25% |
| MgCl$_2$ | 20% |
| Mg$_3$N$_2$ | 15% |
| CaCl$_2$ | 15% |
| KCl | 20% |

The following example is offered by way of illustration and not by way of limitation.

EXAMPLE

Sludge bars from a magnesium processing plant were crushed with a primary crusher, then a secondary crusher, and finally a rolls crusher. The resulting chunks and particles were sorted by size and the minus 35 mesh fraction, the sludge bar residue, was reserved for use as a deicing agent. The component analysis, by weight, of the sludge bar residue was substantially as follows:

| | |
|---|---|
| Mg$_3$N$_2$ | 15% |
| Mg (metal) | 5% |
| MgO | 25% |
| MgCl$_2$ | 20% |
| CaCl$_2$ | 15% |
| KCl | 20% |

The sludge bar residue was mixed with sand so that the resulting formulation was approximately 80–90%, by weight, sand. The deicing formulation was applied to an ice and snow covered road by use of a sand-scattering vehicle. The snow and ice melted and remained in liquid form.

From the foregoing it will be appreciated that, although specific embodiments of the invention have been described herein for purposes of illustration, various modification may be made without deviating from the spirit and scope of the invention. Accordingly, the invention is not to be limited except as by the appended claims.

I claim:

1. A method for melting snow or ice on surfaces, comprising:
   applying to the surface an effective amount of a chemical formulation comprising magnesium metal, magnesium oxide, and at least one chloride salt.

2. The method of claim 1 wherein said formulation further comprises magnesium nitride.

3. The method of claim 1 wherein said formulation further comprises calcium oxide.

4. The method of claim 1 wherein the chloride salt is chosen from the group consisting of magnesium chloride, potassium chloride, calcium chloride, and sodium chloride, or mixtures thereof.

5. The method of claim 1 wherein the magnesium metal constitutes approximately 5–10%, by weight, of the formulation.

6. The method of claim 1 wherein the magnesium oxide constitutes approximately 20–25%, by weight, of the formulation.

7. The method of claim 2 wherein the formulation has substantially the following component analysis, by weight:

| Component | Percentage (by weight) |
|---|---|
| Mg (metal) | 5–10% |
| MgO | 20–25% |
| MgCl$_2$ | 0–20% |
| Mg$_3$N$_2$ | 0–20% |
| CaCl$_2$ | 0–20% |
| KCl | 0–25% |

8. The method of claim 7 wherein the formulation has substantially the following component analysis, by weight:

| | |
|---|---|
| Mg (metal) | 5% |
| MgO | 25% |
| MgCl$_2$ | 20% |
| Mg$_3$N$_2$ | 15% |
| CaCl$_2$ | 15% |
| KCl | 20% |

9. The method of claim 1 wherein the chemical formulation is in the form of a coarse particle blend.

10. The method of claim 9 wherein the coarse particle blend is of a size of about a minus 35 mesh.

11. A snow and ice control composition for use on a surface, comprising:
   a mixture of a traction material and a chemical formulation comprising magnesium metal, magnesium oxide, and at least one chloride salt.

12. The composition of claim 11 wherein the traction material is selected from the group consisting of sand, nutshells, expanded shale, and pulverized corncobs.

13. The composition of claim 11 wherein the chemical formulation further comprises magnesium nitride.

14. The composition of claim 11 wherein the chemical formulation further comprises calcium oxide.

15. The composition of claim 11 wherein the chloride salt is chosen from the group consisting of magnesium chloride, potassium chloride, calcium chloride, and sodium chloride, or mixtures thereof.

16. The composition of claim 11 wherein the magnesium metal constitutes approximately 5–10%, by weight, of the formulation.

17. The composition of claim 11 wherein the magnesium oxide constitutes approximately 20–25%, by weight, of the formulation.

18. The formulation of claim 13 wherein the coarse particle blend has substantially the following component analysis, by weight:

| | |
|---|---|
| Mg (metal) | 5–10% |
| MgO | 20–25% |
| MgCl$_2$ | 0–20% |
| Mg$_3$N$_2$ | 0–20% |
| CaCl$_2$ | 0–20% |
| KCl | 0–25% |

19. The composition of claim 18 wherein the formulation has substantially the following component analysis, by weight:

| | |
|---|---|
| Mg (metal) | 5% |
| MgO | 25% |
| $MgCl_2$ | 20% |
| $Mg_3N_2$ | 15% |
| $CaCl_2$ | 15% |
| KCl | 20% |

20. The composition of claim 11 wherein the chemical formulation is in the form of a coarse particle blend.

21. The composition of claim 20 wherein the coarse particle blend is of a size of about a minus 35 mesh.

22. A process for the manufacture of a composition suitable for surface deicing, comprising a traction material and a chemical formulation containing magnesium metal, magnesium oxide, and chloride salts, comprising the steps of:
  (a) providing solidified sludge bars from spent flux of a magnesium processing refining furnace;
  (b) grinding the sludge bars to produce a minus 35 mesh fraction; and
  (c) mixing the minus 35 mesh fraction with a traction material.

* * * * *